United States Patent [19]
Carson

[11] 3,853,513
[45] Dec. 10, 1974

[54] VAPOR-LIQUID SEPARATION APPARATUS
[75] Inventor: Don B. Carson, Mt. Prospect, Ill.
[73] Assignee: Universal Oil Products Company, Des Plaines, Ill.
[22] Filed: July 2, 1973
[21] Appl. No.: 375,967

[52] U.S. Cl. .................. 55/185, 55/329, 55/337, 55/459, 55/525
[51] Int. Cl. .................. B01d 19/00, B01d 50/00
[58] Field of Search ............ 55/337, 458, 459, 355, 55/204, 184, 185, DIG. 22, DIG. 23, 525, 259, 329

[56] References Cited
UNITED STATES PATENTS

| | | | |
|---|---|---|---|
| 1,461,174 | 7/1923 | Bennett | 55/355 X |
| 1,588,861 | 6/1926 | Walker | 55/204 X |
| 1,770,773 | 7/1930 | Hackett | 55/204 X |
| 1,770,774 | 7/1930 | Hackett | 55/204 |
| 1,870,193 | 8/1932 | Grahame | 55/459 X |
| 1,923,599 | 8/1933 | Walker | 55/184 |
| 2,288,245 | 6/1942 | Kopp | 55/204 X |
| 2,511,967 | 6/1950 | Campbell | 55/458 X |
| 2,777,533 | 1/1957 | Segrest | 55/204 |
| 2,861,647 | 11/1958 | Musslewhite | 55/201 X |
| 2,883,369 | 5/1958 | Laurence et al. | 55/173 |
| 2,925,878 | 2/1960 | Spann | 55/204 X |
| 2,934,166 | 4/1960 | Van Rossum | 55/355 |
| 3,008,538 | 11/1961 | Glasgow | 55/204 X |
| 3,088,595 | 5/1963 | Robb | 55/204 X |
| 3,212,234 | 10/1965 | McMinn | 55/459 X |

FOREIGN PATENTS OR APPLICATIONS

| | | | |
|---|---|---|---|
| 17,568 | 1915 | Great Britain | 55/459 |

*Primary Examiner*—Dennis E. Talbert, Jr.
*Attorney, Agent, or Firm*—James R. Hoatson, Jr.; Robert W. Erickson; William H. Page, II

[57] ABSTRACT

A mixed-phase fluid stream is separated into vapor and liquid streams in an enclosed vessel having a substantial liquid holdup which seals off the bottom of a vertical central vapor conduit extending from the top of the vessel. The mixed-phase stream is discharged outside of the vapor conduit, and liquid material falls to the lower portion of the vessel for removal as part of the retained liquid. Vapor enters the vapor conduit through perforations in sides of the conduit, passes upward and through a horizontal demisting screen and then leaves the vessel. Gas bubbles entrained in the liquid rise to a stagnant liquid surface in the bottom of the vapor conduit and break down to thereby reduce gas entrainment.

1 Claim, 2 Drawing Figures

PATENTED DEC 10 1974

3,853,513

3,853,513

VAPOR-LIQUID SEPARATION APPARATUS

BACKGROUND OF THE INVENTION

1. Field of the Invention

My invention relates to an apparatus for the separation of vapor and liquid contained in a mixed-phase fluid stream. My invention more particularly relates to a separator which promotes the removal of entrained liquid from a vapor stream through the use of perforated materials in the vapor bath. A specific application of my invention is the separation of a partially condensed reactor effluent in a hydrocarbon conversion process.

2. Description of the Prior Art

There are a great number of vessel designs known in the art to be useful for the separation of vapors and liquids. Two representative examples of the diverse apparatus found in this field are described in U.S. Pat. Nos. 2,788,080 and 2,882,994. The prior art has utilized spherical vessels, centrifugal force resulting from the angular discharge of the charged material and demisting screens in the vapor flow path.

BRIEF SUMMARY OF THE INVENTION

A very efficient and simple vapor-liquid separation apparatus may be formed by attaching an open bottomed and perforated cylindrical vapor conduit to the top of a separation vessel and extending it downward into a sectioned pool of retained liquid. The liquid seals the bottom of the tube to prevent vapors from by-passing a number of small openings located in the wall of the vapor conduit, but does not prevent the passage of entrained gas bubbles upward to the stagnant liquid surface in the bottom of the conduit where they are allowed to decompose. A horizontal demisting screen extends across the conduit above the perforations to knock out entrained liquid droplets.

DESCRIPTION OF THE DRAWINGS

The preferred embodiment may be illustrated in terms of the separation of the mixed-phase effluent stream derived from the reaction zone of a hydrocarbon conversion process. The vapor fraction of the mixed-phase stream will often consist of normally gaseous hydrocarbons such as methane and butane admixed with hydrogen and possibly hydrogen sulfide and ammonia, while the liquid-phase stream will normally comprise the heavier hydrocarbons discharged from the reaction zone. In FIG. 1, this mixed-phase stream enters the outer vessel 1 through a mixed-phase fluid inlet means 2 which is shown in the drawing as ending in a flow directing means 3 shaped as a curved rectangular nozzle. The flow directing means uniformly distributes the incoming material over the inner surface of the apparatus and imparts a whirling motion which aids in the separation of liquid material from foam and vapor by centrifugal action. The heavier liquid material falls to a liquid level 4 which is maintained at about a mid-point of the apparatus. The liquid then becomes a part of the bulk liquid 5 maintained within the apparatus and eventually passes down between the vertical vortex breaking baffles 12 to a flow stabilizing means 7 located above liquid outlet means 8 from which the liquid is discharged. The flow stabilizer 7 is illustrated as a perforated cap which is placed over the liquid outlet to require liquid to flow out of the vessel from several separate directions. The vertical baffles reduce the tendency of the outgoing liquid to produce a swirling motion in the retained liquid. An over abundance of liquid in one section of the vessel is relieved by passage of the liquid through perforations 14 in the baffles.

Figure 1:
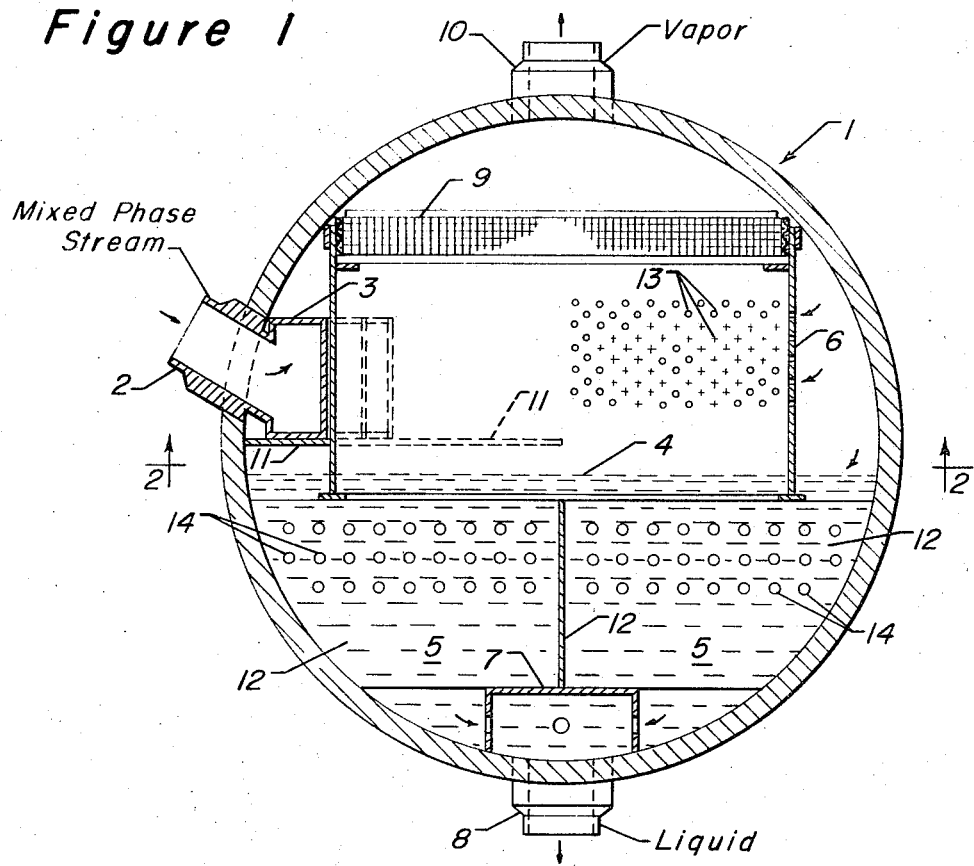
FIG. 1 presents a view of the preferred embodiment of my invention as it would appear if the apparatus was sectioned vertically through its center on a plane passing through the inlet and outlet lines.

Foam which is formed upon the discharge of the mixed-phase stream into the internal volume of the vessel will be trapped outside the central vapor conduit 6 because the vapor conduit is sealed at its open bottom end by the liquid level 4. This foam either breaks down in this location or accumulates to such a height that it passes through the perforations 13 in a vapor conduit 6. If passage through the perforations does not destroy the foam, it settles to the surface of the stagnant liquid in the bottom of the conduit. Vapor released from the foam and a larger volume of naturally released vapor passes through the demisting means 9. A certain amount of vapor is usually entrained into the liquid phase in the form of gas bubbles which are carried along with the downward flow of the liquid towards the liquid outlet means 8. The preferred embodiment reduces the entrainment of these gas bubbles in the liquid stream by requiring a relatively long horizontal passage of the gas bubbles from the outside of the vapor conduit 6 to the liquid outlet means 8 while at the same time reducing the vertical velocity component of the liquid by spreading the downward liquid flow over a very substantial cross-sectional area of the vessel. A combination of a large horizontal distance to be traveled and a relatively low vertical velocity component of the liquid allows many of the entrained gas bubbles to rise into the internal volume of the central vapor conduit and accumulate on liquid level 4. The gas bubbles eventually break down in this stagnant area, and the vapor passes upward through demisting means 9 and vapor outlet means 10 together with the vapor which has passed through the perforations 13.

Figure 2:
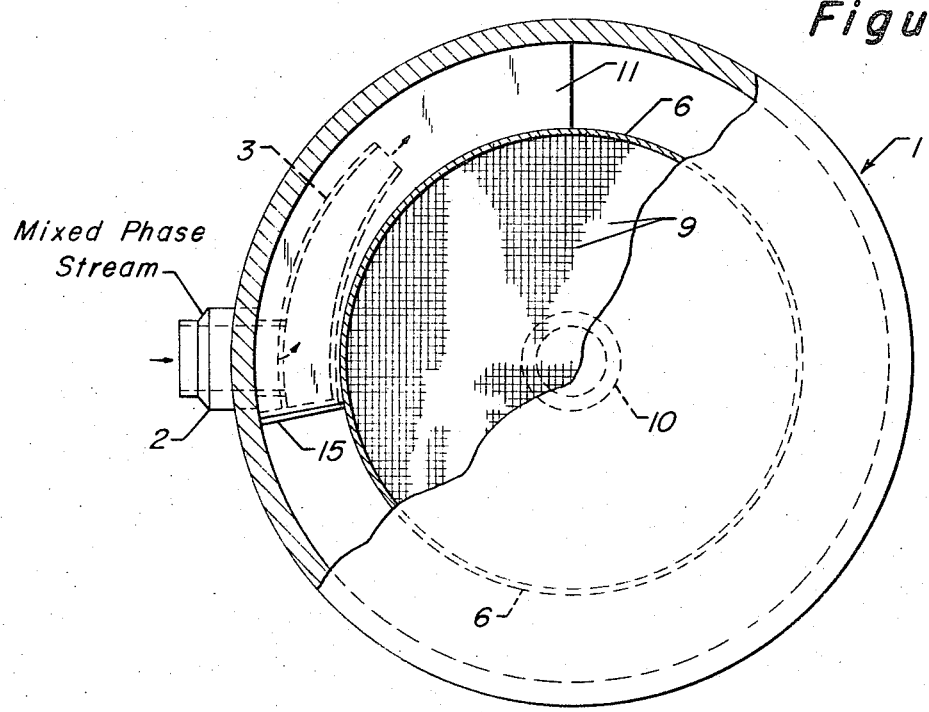
FIG. 2 presents the view seen looking upward when the apparatus is sectioned horizontally at its vertical mid-point.

In FIG. 2, the view looking upward toward the vapor outlet 10 located at the top of the outer vessel 1 is presented. This view more clearly shows the arrangement of the mixed-phase inlet line 2 and flow directing means 3. The flow director is curved to fit the contour of the inner surface of the vessel. Vapors released from the incoming stream circulate around the internal volume of the vessel between the outer vessel 1 and central vapor conduit 6 and then pass through the perforations 13 into the central vapor conduit. These vapors combine with the vapors released from gas bubbles which entered the bottom of the central vapor conduit 6, pass through demisting means 9, and leave the apparatus through the vapor outlet 10.

Several structural differences from the rest of the vessel are located at the mixed-phase inlet to the vessel. The mixed-phase fluid inlet flow directing means 3 shown in the drawing discharges the mixed-phase stream only in a clockwise angular direction. A horizontal plate 11 extends for one quarter of the circumference of the vessel and is placed just under the flow directing means 3 to act as a fluid flow barrier between the central vapor conduit 6 and the inner surface of the outer vessel. Since the flow directing nozzle 3 only extends for about 45° of the vessel's circumference, some of the heavier liquid material will fall onto the horizontal plate in a layer before descending to the bottom of the vessel. A vertical quarter circle-shaped plate 15 closes off the nondischarge end of the volume above horizontal plate 11 which contains the mixed-phase fluid flow directing means 3. In this section of the vessel marked off by horizontal plate 11, there are no perforations in the central vapor conduit as are present in the other three quarters of the conduit.

DETAILED DESCRIPTION

In many chemical processing operations, it is often necessary to separate a mixed-phase stream into separate streams of vapor and liquid. Such separations occur very often in the hydroprocessing of hydrocarbons when it is desired to remove the normally gaseous components such as hydrogen so that they may be at least partially recycled or recovered. Separations may also be required after a vapor stream has been contacted with a lean oil or amine solution to selectively remove certain constituents. Other situations in which separators are used include petrochemical plants, pulp mills, metal extracting or leaching operations, and crude oil separations at the well head.

It is an object of my invention to provide a simple apparatus which will separate a mixed-phase fluid stream into separate streams of vapor and liquid. In particular, one objective is to provide an apparatus which limits the amount of vapor entrained in the liquid stream as gas bubbles and also the amount of liquid material entrained in the vapor stream.

The basic structure of the apparatus is a spherical or vertically orientated cylindrical outer vessel having a relatively large central vapor conduit connected to its upper inner surface and extending downward to below the level at which liquid is maintained. This conduit divides the internal volume of the vessel into a volume outside of the vapor conduit into which the mixed-phase feed stream is discharged and a central volume located within the vapor conduit. Vapors pass into the vapor conduit through openings or perforations in the side of the conduit and then exit from the vessel through a vapor outlet means which communicates with the internal volume of the vapor conduit. Liquid material falls to the bottom of the internal volume of the vessel wherein a sizable quantity is retained for an average time of about 1 minute. Maintenance of the liquid level at a point above the bottom of the central vapor conduit provides a seal which prevents the flow of vapor and foam into the bottom of the vapor conduit from the volume between the conduit and inner surface of the vessel. The absence of any bottom plate however, allows the completely free passage of vapors released from gas bubbles entrained in the liquid into the internal volume of the central conduit.

The invention may be described as an apparatus for the separation of a mixed-phase fluid stream, in which apparatus a quantity of liquid is maintained, and which comprises: (a) an outer vessel having an enclosed inner volume and hereinafter described fluid transfer means communicating with said internal volume; (b) a central vapor conduit having walls extending downward from the upper surface of the internal volume of said conduit into the lower portion of the vessel to a point below the normal liquid level maintained in the vessel and in open communication with this liquid, said walls having perforations which allow the passage of material horizontally into the central vapor conduit, the perforations being above the normal liquid level; (c) a mixed-phase fluid inlet means passing through a wall of said outer vessel and communicating with the internal volume of the outer vessel which is located outside of said central vapor conduit; (d) a demisting means located within said central vapor conduit and extending across the horizontal cross-sectional area of said vapor conduit at a point above said perforations in the conduit wall; (e) a vapor outlet means passing through a wall of the outer vessel and communicating with the internal volume of said vapor conduit above said demisting means; and, (f) a liquid outlet means passing through a wall of the outer vessel and communicating with the internal volume of the outer vessel at a point located within the lower portion of the vessel below the normal liquid level maintained in the vessel.

The diverse range of materials which are separated in the chemical processing industries and the wide range of temperatures and pressure used preclude the practical specification of those materials of construction which should be used in each application. Most commonly, a carbon or stainless steel is used at elevated temperatures and pressures, but other metals such as fiberglass or plastic may be more suitable at lower pressures and temperatures, especially if extremely corrosive fluids are involved.

The relatively simple design of the apparatus of the present invention makes it quite susceptible to modification by those skilled in the art of vapor-liquid separation and vessel design. The outer vessel and the vapor conduit may be of a different shape than that shown in drawing without departing from the inventive concept. A spherical, cylindrical or frusto-conical outer vessel may all be adapted to the practice of the invention, and in a like manner, the vapor conduit need not by cylindrical in shape. The outer vessel is preferably spherical since a sphere requires only one-half the wall thickness of a cylinder at any given design pressure and the construction cost of a spherical separator is therefore lower. The design of the outer vessel will be in accordance with recognized safety codes well known to those skilled in the art and will depend on the design temperature and pressure and corrosiveness of the materials being handled.

Basically, the outer vessel serves to enclose the annular inner volume wherein the major vapor-liquid separation is performed and it is therefore normally sealed at all points except for the required fluid transfer means, control system openings and manways. Three required fluid transfer means are a mixed-phase fluid inlet means which communicates with the inner volume of the vessel above the normal liquid level and outside of the central vapor conduit, a liquid outlet means communicating with the lower portion of the vessel at a point below the normal liquid level, and a vapor outlet means communicating with that portion of the internal volume of the outer vessel which is within the vapor conduit and above the normal liquid level. These fluid transfer means may differ from that shown in the drawing. For instance, the vapor outlet means may be a line entering the bottom of the vessel and extending upward to an opening in the vapor conduit. In a similar manner, the mixed-phase fluid inlet means may enter through the top or bottom of the vessel.

The mixed-phase inlet means will normally end in a flow directing means which will discharge the incoming stream substantially tangentially to the inner surface of the outer vessel in one angular direction only. This spreads the liquid over the surface of the vessel and greatly aids in the separation of the fluids by centrifugal action and also lessens the foam producing turbulence in the vessel. A tangential discharge of the fluids also lessens impact of the incoming stream within the central vapor conduit wall and produces a more uniform gas velocity through the perforations. The incoming material is preferably discharged in only one angular direction, that is either clockwise or counterclockwise instead of splitting the flow into two or more separate portions entering in different directions.

The vapor conduit will preferably extend downward to a point in the lower one-half of the apparatus as defined by a horizontal plane bisecting the apparatus at its horizontal center line. The portion of the apparatus located below this plane is referred to herein and in the appended claims as the lower portion of the apparatus. Extending the wall down below the intended liquid level further than needed to seal off the vapor conduit provides a greater measure of versatility in the operation of the apparatus. In the wall of the central conduit is located a number of perforations which partially break down some foam which passes into the central vapor conduit. The conduit should extend upward to the upper inner surface of the outer vessel to prevent passage of vapors into the conduit except through the perforations or through the bottom of the conduit. In practice, this central conduit would not be welded to the top of the inner vessel but will rest on the baffles below. An overlapping lip should therefore be provided on the surface of the vessel to provide a relatively flow-restricting seal.

It is preferred that the demisting means comprise a horizontal circular pad extending across the vapor conduit at a point located above the perforations. This demisting means may be one or more layers of commercially available woven wire mesh or a honeycomb structure. Probably the most important factor in the design of the demisting means is the vapor velocity through it, and this is set by the rate at which vapor is charged to the vessel and the surface area of the coalescing means. Design criteria for picking preferred velocities are known to the art and may be found for instance, in the article by E. R. Niemeyer on pages 155 and 156 of Vol. 40, No. 6 of *Hydrocarbon Processing and Petroleum Refiner* (June 1961).

A certain amount of liquid must be retained in the lower portion of the apparatus to provide the seal for the open bottomed vapor conduit. This level may be controlled through the use of any of the conventional liquid level measurement devices such as floats or capacitance probes. The large bulk of retained liquid also reduces the average downward liquid velocity and therefore allows entrained gas bubbles to rise into the vapor conduit. This is combined in the preferred embodiment with the placement of the liquid outlet in a central location below the vapor conduit to require the liquid to flow horizontally under the vapor conduit. The bottom sections of the internal volume of the vessel near the liquid outlet should contain some vortex breaking means such as the vertical baffles and the cap-like device shown in the drawing which requires the fluid to approach the outlet from several directions. It is preferred that the liquid level be maintained near the horizontal centerline of the vessel or a short distance below it. It is also preferred that the outer vessel be sized to provide about one minute or more of liquid residence when the liquid level is maintained near the centerline. This liquid level may be adjusted during operation to improve the separator's performance since lowering the liquid level reduces the liquid residence time but raises the vapor residence time and the amount of volume available for foam breakdown.

As an example of the practice of the invention, the construction of a vessel designed to separate the effluent of a black oil hydrotreating process to which is charged 35,000 barrels of a 9.7 °API material and 5,000 standard cubic feet of hydrogen per barrel of oil will be described. The design conditions included a pressure of 1,960 psig., a temperature of 800°F. and a combined feed ratio of 1.6. The apparatus was designed to divide 980,840 lbs./hour of mixed-phase reactor effluent material into 657,990 lbs./hour of liquid having an average molecular weight of 267, and a specific gravity of 0.651 and 322,850 lbs./hour of vapor having an average molecular weight of 14.72.

The outer vessel used was a sphere having an outside diameter of 10.5 feet. The mixed-phase inlet line was 18 inches in diameter and was connected to a flow director which narrowed to a 2-foot by 7-inch rectangular opening designed to be mounted 1 foot above the horizontal centerline of the vessel. Both the vapor outlet line and the liquid outlet lines were 14 inches in diameter. A 6-inch thick horizontal woven wire mesh was used as the demisting means. This design provides a liquid residence time of about 1 minute when the liquid level is maintained at the vessel's center-line. The number and size of the perforations in the central vapor conduit was chosen to produce a near zero pressure drop, and resulted in the specification of 1,725 holes having a 1-inch diameter. Eight baffles crisscrossed the liquid holding section of the vessel, and each baffle had 26 2-inch diameter holes in rows starting 2 feet 10 inches from their lower surface.

I claim as my invention:

1. An apparatus for the separation of a mixed-phase fluid stream, in which apparatus a quantity of liquid is maintained, and which comprises:
   a. an outer spherical vessel having an enclosed inner volume and hereinafter described fluid transfer means communicating with said inner volume;
   b. a central vapor conduit having walls extending downward from the upper surface of the internal volume of said conduit into the lower portion of the vessel to a point below the normal liquid level maintained in the vessel and in open communication with this liquid, said normal liquid level being at about the horizontal centerline of said vessel, said walls having perforations which allow the passage of material horizontally into the central vapor conduit, the perforations being above said normal liquid level;
   c. a mixed-phase fluid inlet means positioned above the bottom of said central vapor conduit and passing through a wall of said outer vessel, said inlet means communicating with the internal volume of the outer vessel which is located outside of said central vapor conduit, said inlet means having means to discharge incoming material substantially tangentially and in only one angular direction to the inner surface of said vessel;

d. a demisting means located within said central vapor conduit above said inlet means and extending across the horizontal cross-sectional area of said vapor conduit at a point above said perforations in the conduit wall, said demisting means comprising a circular pad of woven wire fabric;

e. a vapor outlet means passing through a wall of the outer vessel and communicating with the internal volume of said vapor conduit above said demisting means; and, f. a liquid outlet means passing through a wall of the outer vessel and communicating with the internal volume of the outer vessel at a point located within the lower portion of the vessel below the normal liquid level maintained in the vessel.

* * * * *